Feb. 15, 1972  F. E. LITTMAN  3,642,773

MODIFIED CELLULOSE ESTER SEMIPERMEABLE MEMBRANE

Filed Dec. 29, 1967  2 Sheets-Sheet 1

INVENTOR.
FRED E. LITTMAN
BY Max Geldin
ATTORNEY

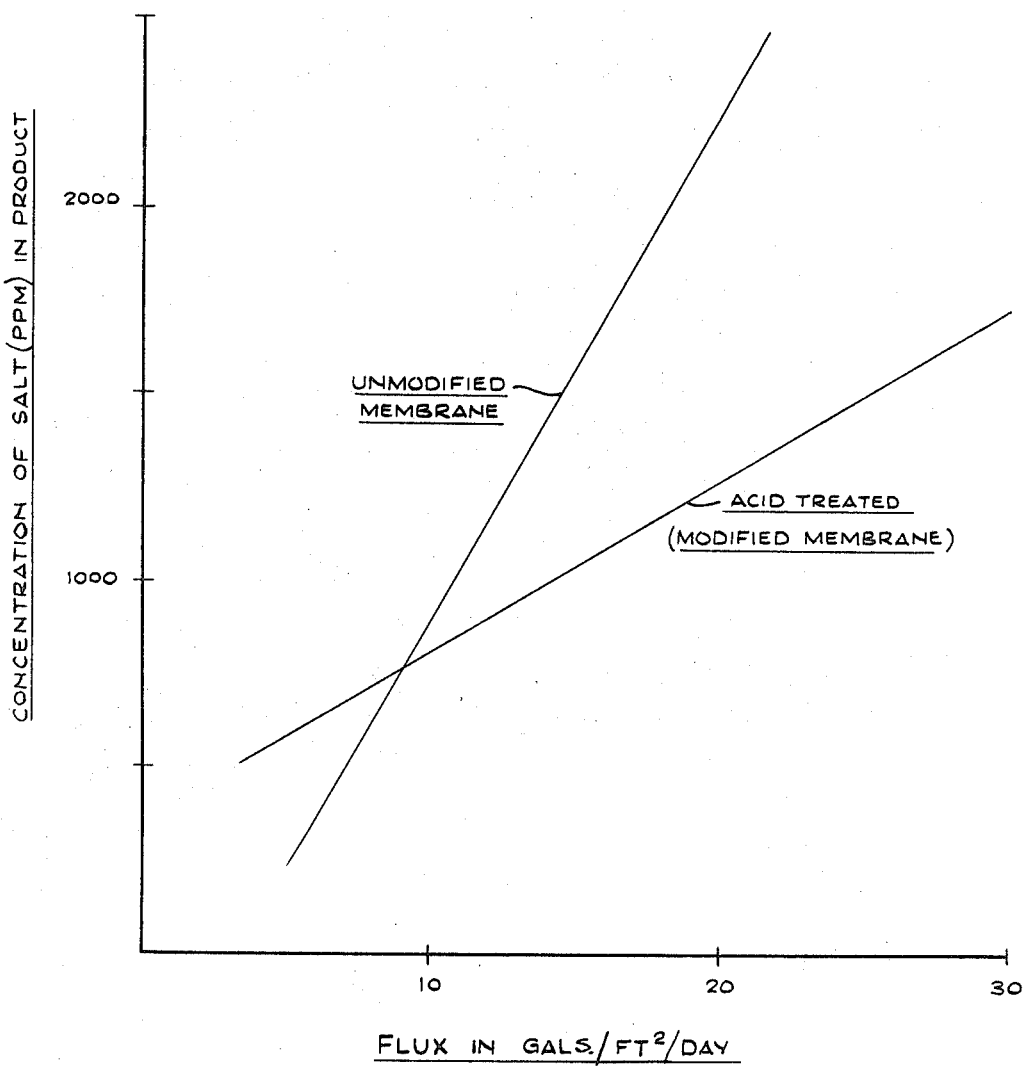

United States Patent Office 3,642,773
Patented Feb. 15, 1972

3,642,773
MODIFIED CELLULOSE ESTER SEMIPERMEABLE MEMBRANE
Fred E. Littman, Santa Ana, Calif., assignor to McDonnell Douglas Corporation, Santa Monica, Calif.
Filed Dec. 29, 1967, Ser. No. 694,524
Int. Cl. B29d 27/04; C08b 3/24, 21/04
U.S. Cl. 260—229      11 Claims

ABSTRACT OF THE DISCLOSURE

Cellulose ester, especially cellulose acetate, semipermeable membranes having superior permeation properties of flux and solute rejection which are particularly suited for desalination of aqueous salt solutions by reverse osmosis, produced by a method which includes pre-treatment of the cellulose ester material in the form of an aqueous slurry with catalytic amounts of a strong acid prior to casting the cellulose ester material into a film. Method for producing the above described membrane, and method for desalination of salt water employing the above described membrane.

---

This invention relates to cellulose ester, and particularly cellulose acetate, semipermeable membranes, and is particularly concerned with novel procedure for producing improved membranes of this type, to the improved cellulose ester, and especially cellulose acetate, membranes so produced, and to a process for utilizing such membranes, particularly for desalination of aqueous salt solutions, employing such membranes.

Reverse osmosis describes the flow or diffusion from a concentrated solution to a dilute solution through a semipermeable membrane separating the two solutions when pressure in excess of osmotic pressure is applied to the concentrated solution.

There has been considerable interest in reverse osmosis since early reports of Reid et al. (J. App. Poly Sci., vol. 1, p. 133 (1959); vol. 2, p. 264 (1959); and vol. 4, p. 354 (1960)) described the selective ability of cellulose acetate films to reject salt while remaining permeable to water. Since that time, extensive work has been directed to the development of improved semipermeable membranes which can be used to reduce the cost of desalination of sea water to a point which would be attractive as a source of pure water.

Experienced workers using cellulose acetate membranes have found that, in general, the salt rejection and flux rates are inversely proportional. Furthermore, decreased flux rates occur as a function of time due to compaction which increases over a period of use. These workers have, therefore, sought a membrane combining consistent high salt rejection at high flux over long periods.

In recent years certain procedures have been suggested for modification of cellulose ester, and especially cellulose acetate semipermeable membranes, in attempts to improve one or more of the permeation properties discussed above.

For example, the Martin, et al. U.S. Pat. 3,140,256 has suggested modifying the permeation properties of cellulose ester membranes by treatment of the cellulose ester material either before or after casting into a film with an organic reagent selected from aldehydes, isocyanates and dibasic acids and their derivatives, which react with the free hydroxyl groups attached to the anhydroglucose units of the cellulose ester. Such membranes have been used to separate liquid mixtures of organic compounds.

It has been suggested by Watson et al., U.S. Pat. 3,250,701 that a high flux rate for an osmotic membrane can be maintained by intermittently relaxing the pressure applied to the feed solution and then repressurizing the system to resume continuous operation.

At present, the cellulose acetate membranes made according to the Loeb-Manjikan procedure which includes heat treatment of the cast membrane, exhibit a salt rejection rate of the order of about 95% at a flux rate of about 10 gallons/ft.$^2$/day, depending on the salt concentration of the feed solution, the pressure used in the reverse osmosis procedure and the degree of desalination required.

It has now been discovered that pre-treatment, prior to casting into films, of cellulose esters, particularly cellulose acetate, in the form of an aqueous slurry with catalytic amounts of a strong acid, produces a semipermeable membrane having greatly improved permeation properties of flux, solute rejection and useful life over the cellulose ester membranes of the prior art.

The invention procedure provides an improved cellulose ester, and particularly a cellulose acetate, semipermeable membrane having superior flux and solute, e.g., salt, rejection properties, a high resistance to compaction, and a long useful life when used in reverse osmosis procedures for separating liquid mixtures, especially for desalination of salt water.

The invention also provides an improved and economical method for desalination of water by a reverse osmosis process which involves using the improved cellulose ester, particularly cellulose acetate, semipermeable membrane hereof.

The invention is described in detail below, in connection with the accompanying drawings wherein:

FIG. 3 is a graph showing salt rejection against flux rate for a cellulose acetate membrane made according to the invention; and for an unmodified cellulose acetate membrane.

Figure 1:
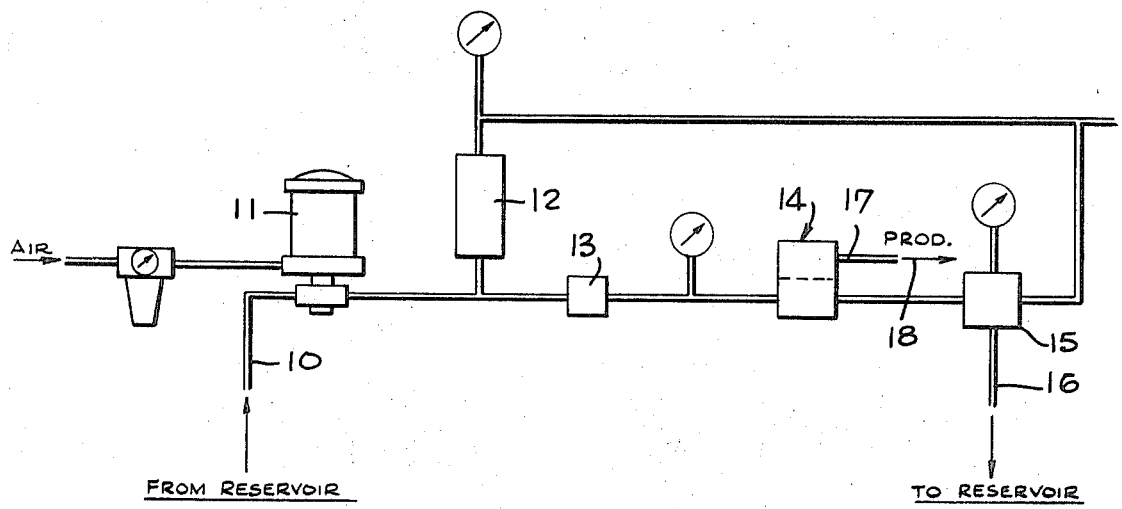
FIG. 1 is a diagrammatical representation of the form of apparatus or system in which desalination tests have been run.

Cellulose is a complex polymeric carbohydrate, $(C_6H_{10}O_5)_x$, composed of recurring anhydroglucose units, each unit having one primary and two secondary alcohol groups. Cellulose esters are usually formed by complete esterification of the alcohol groups followed by partial hydrolysis to give an average of from 0.1 to 2, usually from 0.2 to 1, free hydroxy groups, i.e., not esterified, per anhydroglucose unit. Examples of commercially available cellulose esters are cellulose acetate, cellulose acetate-propionate, cellulose propionate, cellulose acetate-butyrate, cellulose butyrate, cellulose acetate-valerate, and cellulose acetate-benzoate. Any cellulose ester capable of being formed into a semipermeable memberane can be treated according to the invention to improve the permeation properties of a membrane formed therefrom. Cellulose acetate is preferred for use in desalination processes because of its particular ability for salt rejection, its availability and low cost. Improved cellulose ester membranes, which have been modified according to the invention are particularly useful in desalination processes. However, the invention is not limited to utilization of the improved membranes hereof in desalination processes but is intended to include their use in other reverse osmosis procedures employing cellulose ester semi-permeable membranes. The invention will be described chiefly with reference to the preferred cellulose acetate semi-permeable membranes produced by the invention process, although it will be understood that any other cellulose ester can be substituted for the cellulose acetate material in practicing the invention to improve the permeation properties thereof.

The method for modification of cellulose acetate according to the invention involves forming an aqueous slurry of the cellulose acetate and sufficient strong acid catalyst to give an overall concentration of from about 0.1 N to about 1 N. The exact amount of water is not critical and can range from a barely stirrable slurry to a highly dilute aqueous mixture. There is no advantage to these extremes, however, and it is preferred to form an aqueous slurry comprised of from about 5% to about 20% cellulose acetate. All percentages expressed herein and in the appended claims refer to percent by weight unless otherwise specified. The reaction slurry can be formed by adding water to both the cellulose acetate and to the acid catalyst and then combining the two mixtures, or alternatively, by adding all of the water to the cellulose acetate and adding the acid thereto. When the latter procedure is followed, particularly when concentrated acid is used, it is desirable to make dropwise addition of the acid with adequate agitation to avoid local acid concentration. The preferred method involves diluting the acid with water to form a solution of the desired volume and then adding the cellulose acetate to form the reaction slurry.

Any strong acid can be used as the catalyst, such as hydrochloric acid, perchloric acid, sulfuric acid, sulfamic acid, sulfonic acids, such as benzene sulfonic acid and toluene sulfonic acid, and phosphoric acid. Best results have been obtained with inorganic or mineral acids, particularly hydrochloric and perchloric acids. While an overall concentration of acid in the reaction mixture can range from about 0.1 N to about 1 N, best results have been obtained with an overall acid concentration of about 0.5 N.

After effecting the reaction slurry, it is then agitated for a time ranging from about 5 minutes to about 60 minutes, depending upon the temperature and acid concentration. Reaction temperature can range from ambient temperature up to about 100° C. Preferably, within the overall acid concentration of about 0.1 N to about 1 N reaction time is about 40 minutes at 30° C.

It is believed that a hydrolysis reaction takes place in the presence of the above noted strong, e.g., inorganic, acids, with a splitting off of acetyl groups, resulting in alteration of the carbonyl to hydroxyl ratio of the treated cellulose ester, e.g., acetate, material as indicated by changes in the infrared spectrum. The strong acid functions as a catalyst in the reaction, such acid accordingly being employed in relatively small catalytic amounts within the range of acid concentrations noted above. Determination of the endpoint of the reaction is empirical, that is, the reaction should be allowed to proceed for a sufficient period at a given temperature to alter the permeation properties of a semi-permeable membrane formed from the treated material. The use of infrared spectroscopy is helpful in detecting the desired change in carbonyl to hydroxyl ratio.

Upon completion of the reaction the modified cellulose ester is recovered by filtration, washed several times with water to remove residual acid, and dried. It is then used to form a casting solution from which a film of substantially uniform thickness is cast.

The memberane is prepared by casting a solution of the cellulose ester, e.g., acetate, material in an organic solvent for the cellulose ester. Any inert solvent for the cellulose ester, such as acetone or dioxane, can be used in preparing the casting solution, in amounts sufficient to reduce the viscosity of the casting solution so that it is easily handled. The casting solution also contains a modifier, such as magnesium perchlorate, zinc chloride or formamide. A preferred casting solution, for example, comprises 25% cellulose ester, e.g., cellulose acetate, 45% acetone, and 30% formamide.

When the cellulose ester, e.g., acetate, membrane hereof is to be used for desalination of water, it is preferably prepared according to the Loeb-Manjikian method by casting a film of the casting solution on a glass plate base by means of a film casting knife positioned over the glass plate at a distance adjusted to give a film of the desired thickness, usually about 0.0025 inch to about 0.020 inch. After casting, the film, still on the glass plate, is immersed in ice water, usualy about 1° C. to about 5° C., to remove the solvent, for a period of from about 3 minutes to about an hour, followed by immersion in hot water, usually about 70° C. to about 90° C., and preferably about 78° C. for about 30 seconds to about an hour or longer depending on the temperature to fix the membrane and to obtain optimum membrane properties. The film membrane is then cooled by immersion in ambient temperature distilled or deionized water where it is stored until used.

Figure 2:
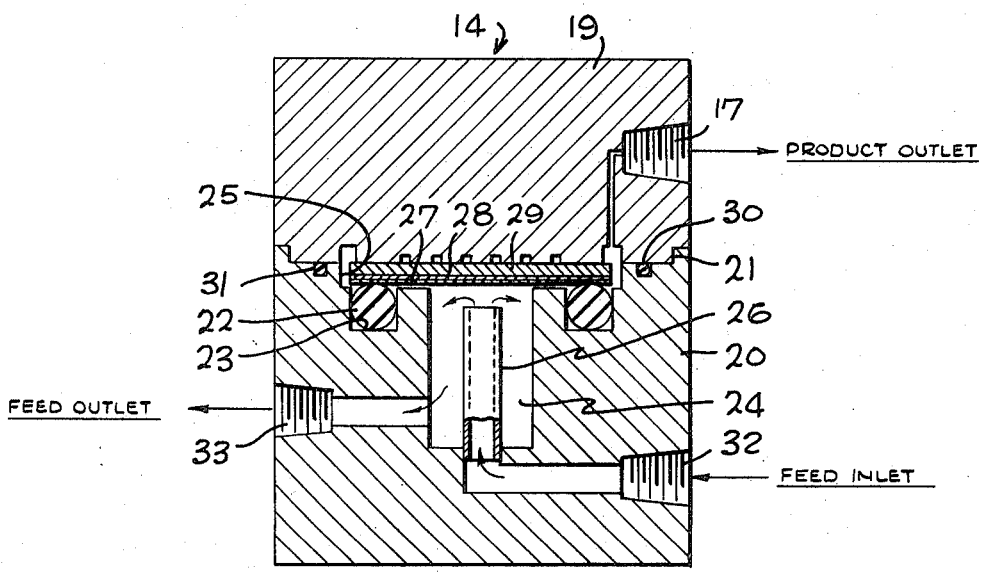
FIG. 2 shows an enlarged sectional view of the reverse osmosis cell shown in FIG. 1.

FIG. 1 of the drawing shows diagrammatically the system in which desalination tests have been run. An enlarged sectional view of the reverse osmosis cell is shown in FIG. 2. In FIG. 1, a saline feed solution can be fed at 10 from a reservoir (not shown). The salt solution is circulated by means of a high pressure pump 11 capable of producing pressures up to 5,000 p.s.i. through a stainless steel high pressure loop, wherein the pulsations of the flow are smoothed out by a hydraulic accumulaor 12. The pressurized salt solution then passes through a polishing filter 13 into the reverse osmosis cell, indicated at 14, and which is shown enlarged in FIG. 2. The bulk of the stream passes through the cell and returns to the reservoir at 16, after flowing through a back pressure regulator 15 which maintains a preset pressure in the system. The desalinated stream passes through the outlet 17 of cell 14, and is collected separately as product at 18.

The reverse osmosis cell 14, shown in detail in FIG. 2, comprises an upper casing 19 and a lower casing 20. The upper casing has a stepped shoulder which interfits with a corresponding stepped shoulder in the lower casing, as shown at 21. The casings are sealed together by means of an O-ring seal 30 disposed in an annular groove 31 of the lower casing. The lower casing has a central opening or bore 24 serving as a contact chamber, and a counterbore 25 of relatively shallow depth. A steel tube 26 is positioned in the central bore 24. The semi-permeable cellulose ester membrane indicated at 27, is positioned in the space of the counterbore at the entrance to the contact chamber, with a back-up paper filter 28, followed by a porous stainless steel back-up plate 29. The peripheral edges of the membrane are sealed by an O-ring seal 22 disposed in an annular groove 23 in the lower casing.

The salt solution passes from the feed inlet 32 through the stainless steel tube 26 into the contact chamber 24 into contact with the memberane 27. The purified water passing through the memberane is withdrawn at the product outlet 17 and the salt enriched solution passes out of the cell through the feed outlet 33.

The following specific examples are presented for the purpose of illustrating the invention and are not intended to be a limitation thereof.

EXAMPLE 1

A reaction vessel equipped with a stirrer and a thermometer was charged with 1,500 ml. of 0.4 N HCl and 300 g. of Eastman Kodak E-398-10 cellulose acetate understood to have a normal acetyl content of 39.8% corresponding to about 55.6% combined acetic acid. The overall concentration of acid in the reaction mixture was about 0.3 N. Agitation of the flask contents at ambient temperature was begun and continued for 10 minutes after which the cellulose acetate was recovered by filtration, washed several times with water to remove any residual acid, and allowed to dry at room temperature.

The modified cellulose acetate material was then used to prepare a cellulose acetate membrane as described below.

A casting solution was prepared by charging a vessel with 450 g. of acetone and 300 g. of formamide and 250 g. of the treated cellulose acetate material. The resulting solution was mixed by rolling overnight. A film was then cast from the viscous, almost colorless solution using an 8 inch square plate glass base and a film casting knife positioned above the plate at a distance calculated to give a 0.10 inch thick film. After casting, the film was air dried for 1½ minutes after which the plate carrying the film was immersed in 4° C. ice water for 1 hour, followed by immersion in hot 76° C. water for 5 minutes. The film was then stripped from the glass plate and stored in distilled water until used for desalination of salt water as described below.

A disc having a 2 inch diameter was cut from the film and mounted in a reverse osmosis pressure cell of the type described in FIG. 2 with the air-dried surface of the membrane in contact with the salt solution, with the back-up disc of filter paper 28 placed between the side of the membrane exposed to the glass plate and the porous stainless steel back-up plate 29.

FIG. 3 shows the concentration of salt in the product against flux rate for the modified cellulose acetate membrane prepared as described above in comparison with an unmodified cellulose acetate membrane. The plot of FIG. 3 shows that for flux rates in excess of about 10 gallons per square ft. of membrane area per day, the product effluent for the modified membrane has a substantially smaller salt concentration than for the unmodified membrane, and that this difference increases with increased flux. Thus, for a flux of 20 gallons/ft.$^2$/day, the effluent product using the modified membrane has a salt concentration of about 1,300 p.p.m. (parts per million) whereas for the unmodified membrane the salt concentration in the product is about 2,300 p.p.m., thus indicating the improved salt rejection properties of the invention membrane.

EXAMPLE 2

A reaction vessel equipped with a stirrer and a thermometer is charged with 300 g. of cellulose acetate and sufficient water to give a total volume of 5.95 liters. Agitation is begun in the reaction vessel and 34.2 ml. of concentrated sulfuric acid (96%, sp. gr. 1.84) is added dropwise over a period of about 17 minutes. Agitation is continued at ambient temperature for an additional 40 minutes. At the end of this time, the treated cellulose acetate is recovered by filtration, washed several times with water, and allowed to air dry at room temperature.

The modified cellulose acetate material is then used to prepare a cellulose acetate membrane according to the procedure outlined in Example 1. When used in a reverse osmosis cell as described in Example 1, the membrane shows improved flux rate and high salt rejection as well as a high resistance to compaction.

EXAMPLE 3

A reaction vessel equipped with a stirrer and a thermometer is charged with 300 g. of cellulose acetate and sufficient water to give a total volume of 1.5 liters. Agitation is begun in the reaction vessel and 1.5 liters of 2 N $HClO_4$ is charged. Heat is applied to bring the temperature of the reaction mixture to and hold it at 99° C. for a period of 10 minutes during which time there is continuous agitation of the vessel contents. At the end of this time, the treated cellulose acetate is recovered by filtration, washed several times with water to remove residual acid, and allowed to air dry at room temperature.

The modified cellulose acetate material is then used to prepare a cellulose acetate membrane according to the procedure outlined in Example 1. When used in a reverse osmosis cell as described in Example 1, the membrane shows superior flux and salt rejection properties and a high resistance to compaction.

EXAMPLE 4

A reaction vessel equipped with a stirrer and a thermometer is charged with 1,200 ml. of 0.5 N toluene sulfonic acid. Agitation is begun in the reaction vessel and 300 g. of cellulose acetate is charged. Heat is applied to bring the temperature of the mixture to and maintain it at 50° C. for a period of 1 hour during which time there is continuous agitation of the vessel contents. At the end of this time, the treated cellulose acetate is recovered by filtration, washed several times with water to remove residual acid, and allowed to air dry at room temperature.

The modified cellulose acetate material is then used to prepare a cellulose acetate membrane according to the procedure outlined in Example 1. When used in a reverse osmosis cell as described in Example 1, the membrane shows improved flux rate and high salt rejection as well as a high resistance to compaction.

EXAMPLE 5

A reaction vessel equipped with a stirrer and a thermometer is charged with 1,000 ml. of 0.2 N phosphoric acid. Agitation is begun in the reaction vessel and 300 g. of cellulose acetate is charged. Heat is then applied to the vessel to bring the temperature of the reaction mixture to and maintain it at 48° C. for a period of 30 minutes during which time there is continuous agitation of the vessel contents. At the end of this time, the treated cellulose acetate is recovered by filtration, washed several times with water to remove residual acid, and allowed to air dry at room temperature.

The modified cellulose acetate material is then used to prepare a cellulose acetate membrane according to the procedure outlined in Example 1. When used in a reverse osmosis cell as described in Example 1, the membrane shows superior flux and salt rejection properties and a high resistance to composition.

Various modifications are contemplated and may be resorted to by those skilled in the art without departing from the spirit and scope of the invention as defined by the appended claims.

I claim:

1. In a method for producing a semipermeable cellulose ester membrane which comprises dissolving cellulose ester material in an inert organic solvent and adding a modified selected from the group consisting of magnesium perchlorate, zinc chloride and formamide, to form a casting solution, and casting the solution to form a membrane of substantially uniform thickness, and immersing the cast membrane in ice water for a period of from about 3 minutes to about an hour, then immersing said film in hot water for about 30 seconds to about an hour; the improvement which comprises using an organic cellulose ester material which has been modified prior to said forming said casting solution and prior to said casting of said casting solution, by a method which comprises stirring an aqueous slurry of a cellulose ester containing an average of from 0.1 to 2 free hydroxy groups per anhydroglucose unit, with a sufficient amount of a strong acid catalyst to give an overall acid concentration in said slurry of from 0.1 N to 1 N at a temperature ranging from ambient temperature up to 100° C.

2. A method as defined in claim 1, wherein said aqueous slurry comprises from 5% to 20% of said cellulose ester, and said aqueous slurry of cellulose ester and strong acid is stirred for a period of from 5 minutes to 60 minutes.

3. A method as defined in claim 1, wherein said cellulose ester is cellulose acetate.

4. A method as defined in claim 1, wherein said cellulose ester is selected from the group consisting of cellulose acetate, cellulose acetate-propionate, cellulose propionate, cellulose acetate-butyrate, cellulose butyrate, cellulose acetate-valerate, and cellulose acetate benzoate.

5. A method as claimed in claim 1 wherein said acid catalyst is a strong acid selected from the group consisting of hydrochloric, perchloric, sulfuric, sulfamic, benzene sulfonic, toluene sulfonic and phosphoric acids.

6. A semipermeable cellulose ester membrane produced according to the method of claim 5.

7. A method as defined in claim 1, wherein said cellulose ester is cellulose acetate and the strong mineral acid is hydrochloric acid.

8. A semipermeable cellulose ester membrane produced according to the method of claim 7.

9. A method as defined in claim 1, wherein said cellulose ester is cellulose acetate and the strong mineral acid is hydrochloric acid, and altering the carbonyl to hydroxyl ratio of the treated cellulose acetate.

10. A method as claimed in claim 1, wherein an aqueous slurry comprising about 17% cellulose acetate is treated with sufficient HCl to give an overall acid concentration of 0.4 N at ambient temperature for a period of about 10 minutes.

11. A semipermeable cellulose ester membrane produced by the method of claim 1.

References Cited
UNITED STATES PATENTS

| | | | |
|---|---|---|---|
| 2,772,266 | 11/1956 | Malm et al. | 260—227 |
| 3,109,743 | 11/1963 | Fleck et al. | 260—227 X |
| 3,290,286 | 12/1966 | Kesting | 264—49 X |
| 3,331,772 | 7/1967 | Brownscombe et al. | 264—41 UX |
| 2,926,104 | 2/1960 | Goetz | 264—41 X |
| 3,084,990 | 4/1963 | Hoffman | 260—227 X |
| 3,133,132 | 5/1964 | Loeb et al. | 264—49 |
| 3,444,286 | 5/1969 | King et al. | 264—41 X |
| 3,527,853 | 9/1970 | Rowley et al. | 264—49 |

OTHER REFERENCES

Malm, Carl J., "Primary Hydroxyl Groups in Hydrolyzed Cellulose Acetate," in The Journal of the American Chemical Society, vol. 72 (1950), pp. 2674–2678, title page.

Ott, Emil, ed. Cellulose and Cellulose Derivatives, second completely revised and augmented edition. Part II, New York, Interscience Publishers, © 1954, pp. 777–780, 1051–1055; title page.

PHILIP E. ANDERSON, Primary Examiner

U.S. Cl. X.R.

106—196; 210—500; 264—41, 49, 217, 218, 299